(12) United States Patent
Daniel

(10) Patent No.: US 7,438,451 B2
(45) Date of Patent: Oct. 21, 2008

(54) AMBIENT LIGHT BASED ILLUMINATION CONTROL

(75) Inventor: Joseph Daniel, Northville, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 362 days.

(21) Appl. No.: 11/349,429

(22) Filed: Feb. 7, 2006

(65) Prior Publication Data

US 2007/0183163 A1    Aug. 9, 2007

(51) Int. Cl.
*F21V 33/00* (2006.01)
(52) U.S. Cl. .................... 362/489; 362/488; 340/469
(58) Field of Classification Search ............ 362/488, 362/489; 340/469, 438, 461, 462
See application file for complete search history.

(56) References Cited

U.S. PATENT DOCUMENTS 6,326,900 B2 * 12/2001 DeLine et al. ........... 340/815.4
6,639,519 B2 * 10/2003 Drummond et al. ...... 340/815.4

* cited by examiner

*Primary Examiner*—Laura Tso
(74) *Attorney, Agent, or Firm*—Young Basile

(57) ABSTRACT

An ambient light based illumination control system for motor vehicles. The system incorporates an ambient light sensor and provides control signals for controlling headlamp illumination and illumination of interior instrument panel lighting. The control system provides a variation of intensities for instrument panel lighting in transient ambient light conditions. The system may further be integrated into systems including navigation displays or other vehicle displays to provide adjustments for such displays in response to varying ambient light levels.

20 Claims, 3 Drawing Sheets

AMBIENT LIGHT BASED ILLUMINATION CONTROL

FIELD OF THE INVENTION

This invention relates to an illumination control system for motor vehicles.

BACKGROUND OF THE INVENTION

Many modern motor vehicles are equipped with automatic headlamp light control systems. These systems utilize an ambient light sensor to automatically switch the headlamps "ON" in nighttime and in low-light driving conditions, and turn them "OFF" or dim the headlamps in brighter conditions. These systems eliminate the need for the driver to manually control the headlamps. The ambient light sensor provides an output signal related to the ambient light level and creates a headlamp "ON" threshold of ambient lighting condition. Thus, when the vehicle equipped with such a system experiences the transition between daytime and nighttime driving conditions, and visa versa, the headlamps are activated and deactivated (or dimmed) when the threshold is crossed.

In addition to forward lighting requirements, ambient lighting conditions also affect instrument panel lighting requirements. In order to provide acceptable contrast for reading instrument panel gauges and indicators, instrument panel lighting is generally provided both in daytime and in nighttime driving conditions. Due to the bright ambient light conditions of daytime driving, the illumination level for instrument panel lighting is greater in daytime as compared with nighttime driving conditions. In vehicles equipped with automatic headlamp control systems, once the headlamps are turned "ON", the instrument panel illumination is changed by the vehicle lighting system in a step manner to a lower intensity. A lower intensity instrument panel illumination is required at nighttime since ambient lighting conditions are low and excessive brightness of instrument panel lighting would be a distraction and a glare hazard. Instrument panel lighting circuits typically incorporate a manual illumination control, allowing the driver to adjust the level of intensity, especially usable in nighttime driving conditions.

In addition to variable intensity instrument panel lighting, many vehicles incorporate navigation systems, typically having a flat panel display such as an LCD type, having a contrast control and/or display brightness control. The display settings are also typically automatically changed between daytime and nighttime driving condition in response to the headlamp "ON" and "OFF" (or dim) control signals.

In presently available ambient light based illumination control systems, the illumination levels of the instrument panel and, if equipped, the navigation display or other vehicle displays, are switched in a step function manner between daytime and nighttime driving conditions. Particularly when the vehicle driver has set a low illumination level for instrument panel lighting, the transition between headlight "ON" and "OFF" conditions can produce a condition in which instrument panel illumination is insufficient in the transition ambient lighting range. This results from the fact that automatic control of instrument panel illumination generally switches abruptly between two levels; a high level associated with daytime driving conditions, and a lower level for nighttime driving conditions which is set at the manual adjusted level as previously described.

The presently available systems thus do not provide optimal instrument panel illumination over the full range of ambient lighting conditions. This leads to the need for the operator to manually adjust panel illumination, which defeats the purpose of providing automatic control.

BRIEF SUMMARY OF EMBODIMENTS OF THE INVENTION

The ambient light based illumination control system in accordance with this invention provides the automatic headlamp control feature of the type discussed previously, and further incorporates an improved instrument panel illumination control feature in which instrument panel lighting is changed over a range of intensities, corresponding to a range of ambient lighting conditions. Thus optimized instrument panel illumination is provided in the transition ambient light range conditions between the bright daytime and nighttime driving conditions. The systems in accordance with this invention may also control navigation displays or other vehicle displays to optimize them in response to varying ambient light levels.

BRIEF DESCRIPTION OF THE DRAWINGS

The accompanying drawings incorporated into and forming a part of the specification illustrate several aspects of embodiments of the present invention, and together with the description serve to explain the principles of the embodiments the invention. In the drawings.

DETAILED DESCRIPTION OF THE INVENTION

Figure 1:
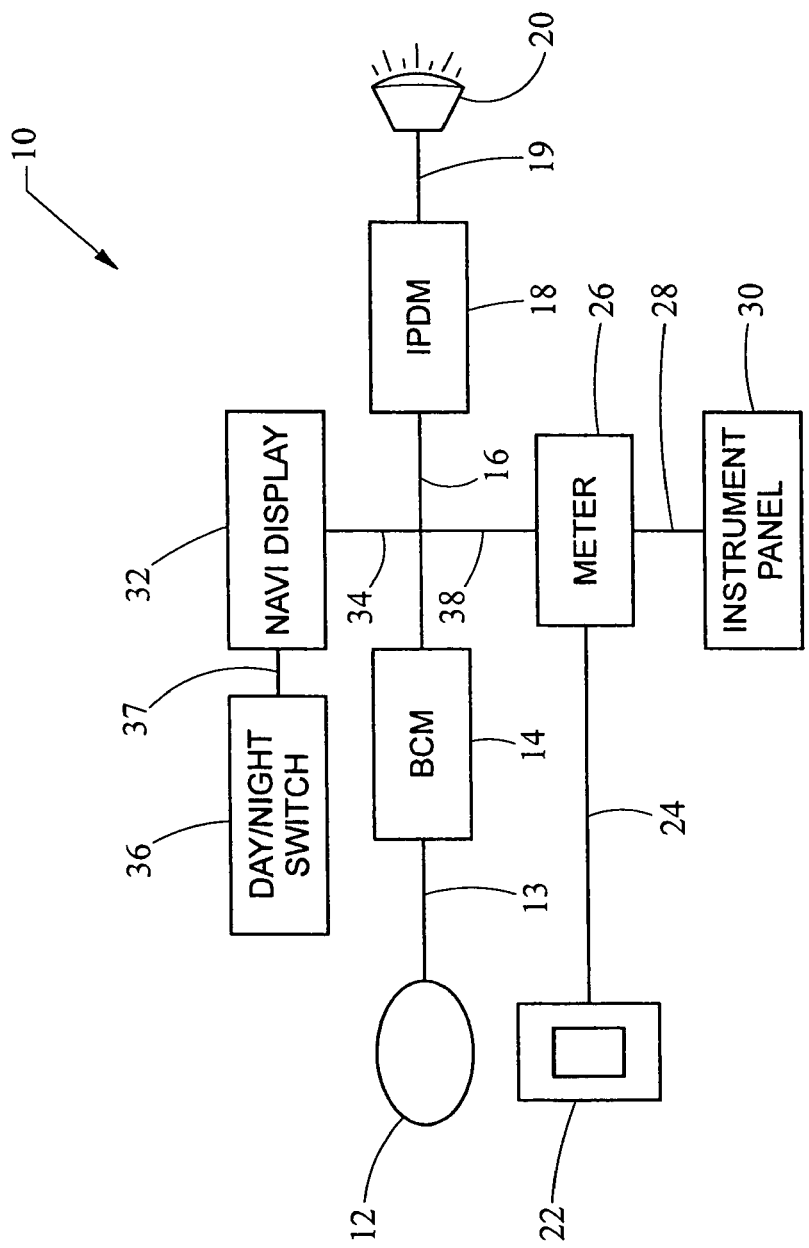
FIG. 1 is a schematic diagram of an ambient light based illumination control system in accordance with a first embodiment of this invention.

With particular reference to FIG. 1, an ambient light based illumination control system for a motor vehicle in accordance with a first embodiment of this invention is shown and is designated by reference number 10. Control system 10 incorporates an ambient light sensor 12 which may provide an analog or digital electrical output related to the intensity of the ambient lighting condition surrounding the motor vehicle. Ambient light sensor 12 may be selected as one of the presently used and available components and are typically located on the upper surface of the instrument panel of the vehicle, below the windshield, and are thus exposed to the ambient lighting conditions surrounding the vehicle. Ambient light sensor 12 provides its output signal into body control module 14 on line 13. Body control module 14 would likely provide a number of electronic control functions for the vehicle's operation, with those functions described in this specification being only part of the total functional capability of control module 14. Body electrical bus 16 provides a pathway in which an output signal from body control module 14 is directed to integrated power distribution module (IPDM) 18. Module 18 is typically located in the engine compartment of the vehicle and provides electrical power distribution for vehicle functions including operation of the headlamps 20 provided for forward illumination for the vehicle. Power is supplied to headlamps 20 via line 19.

Control system 10 further incorporates a manually adjustable instrument panel illumination control 22. Panel illumination control 22 is typically a thumb wheel or slide type switch located on the instrument panel of the vehicle to provide manual adjustment of the nighttime illumination level for instrument panel lighting. Various other types of switches could be used for control 22. Line 24 indicates that the panel illumination control 22 is connected to meter 26. Meter 26 provides a modulated power output on line 28 to the instrument panel lighting network 30. Although various modulation approaches can be used, one approach is to provide a pulse width modulated (PWM) DC output signal to instrument panel lighting network 30 to provide the desired average intensity for the instrument panel illuminators.

System 10 further may incorporate navigation system display 32 which connects with vehicle bus 16 on line 34. Navigation system display 32 would typically incorporate a user operated day/night switch 36 connecting with the display via line 37, which provides for a variation in the display characteristics appropriate for the varying ambient lighting conditions. Other types of displays may be controlled by system 10 such as those associated with TVs, DVD players, etc.

In operation, ambient light sensor 12 provides its signal related to ambient lighting conditions to body control module 14. When the ambient lighting condition crosses a predetermined headlamp "ON" threshold, body control module 14 sends a control signal on bus 16 to module 18 to control illumination of headlamps 20. A control signal from module 14 is further directed via line 38 to meter 26, functioning to vary instrument panel illumination over a range of intensities between the daytime and nighttime levels.

Figure 2:
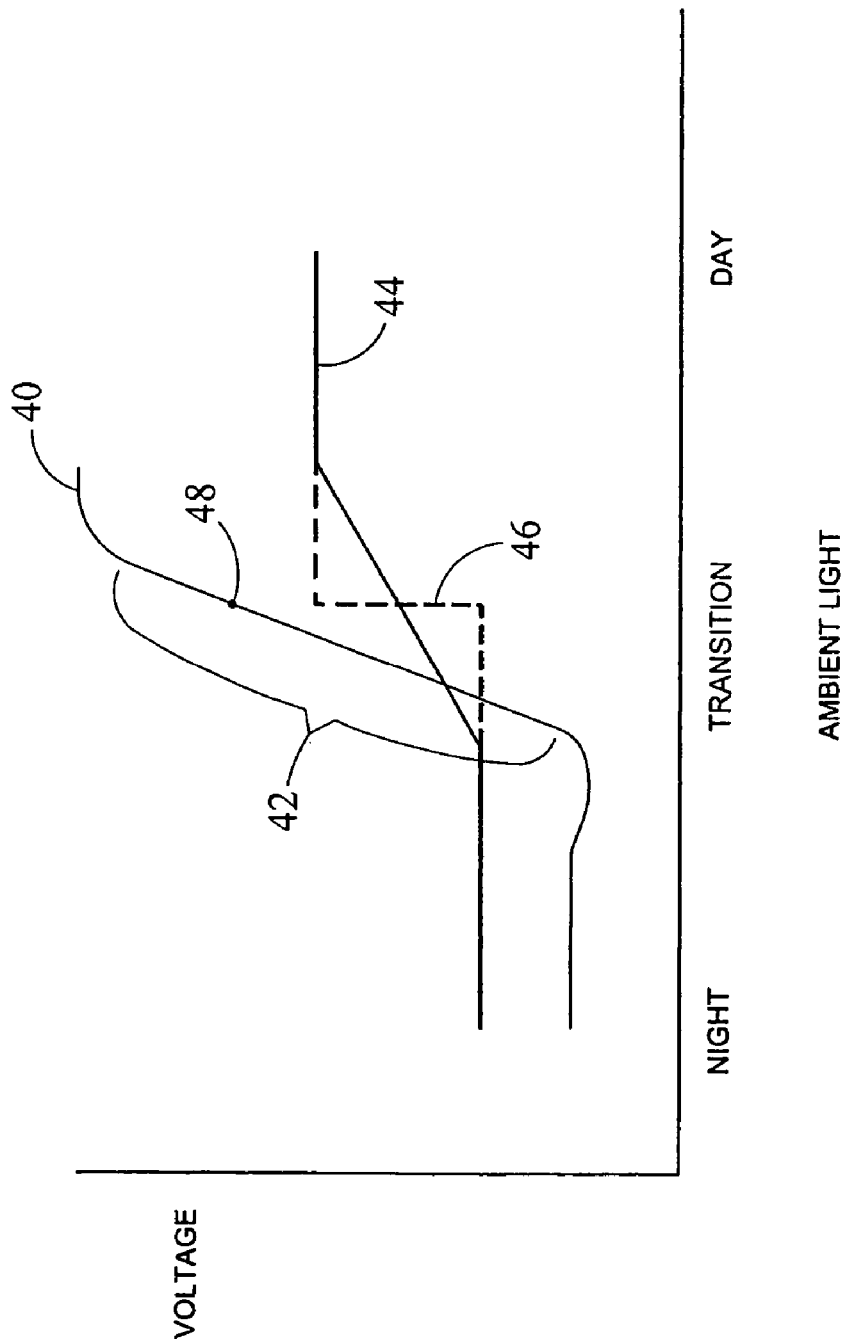
FIG. 2 is a graph illustrating the ambient light level sensor output and the illumination levels for instrument panel lighting for both the prior art systems and systems in accordance with embodiments of the present invention.

Now with reference to FIG. 2, the operation of control system 10 is further described. Curve 40 illustrates the level of a signal generated by ambient light sensor 12 between night, transition and day ambient lighting conditions. Curve 40 indicates that the output signal is maximized in bright daytime driving conditions ("DAY" in FIG. 2) and minimized in nighttime driving conditions ("NIGHT" in FIG. 2). Significantly, ambient light sensor 12 provides a variable output between the extreme lighting conditions mentioned previously. The transition range 42 of curve 40 is associated with transition lighting conditions such as experienced between dusk and dawn ("TRANSITION" in FIG. 2), and visa versa. Curve 44 illustrates the intensity level for instrument panel illumination as controlled on line 28. The dotted line curve 46 illustrates a step change in the instrument panel lighting illumination. In accordance with a principal feature of this embodiment, curve 44 (shown in full lines) is smoothened between its low and high levels in the range of dotted line curve 46 in response to the lighting conditions in the transition range 42. Thus, the intensity level of instrument panel illumination "tracks" the ambient light levels in the transition range 42 of ambient light levels. This operation would also avoid the driver noticing a sudden change in instrument panel lighting when the headlamps are switched "ON" or "OFF" which occurs when ambient lighting crosses the headlamps "ON" threshold point 48.

Figure 3:
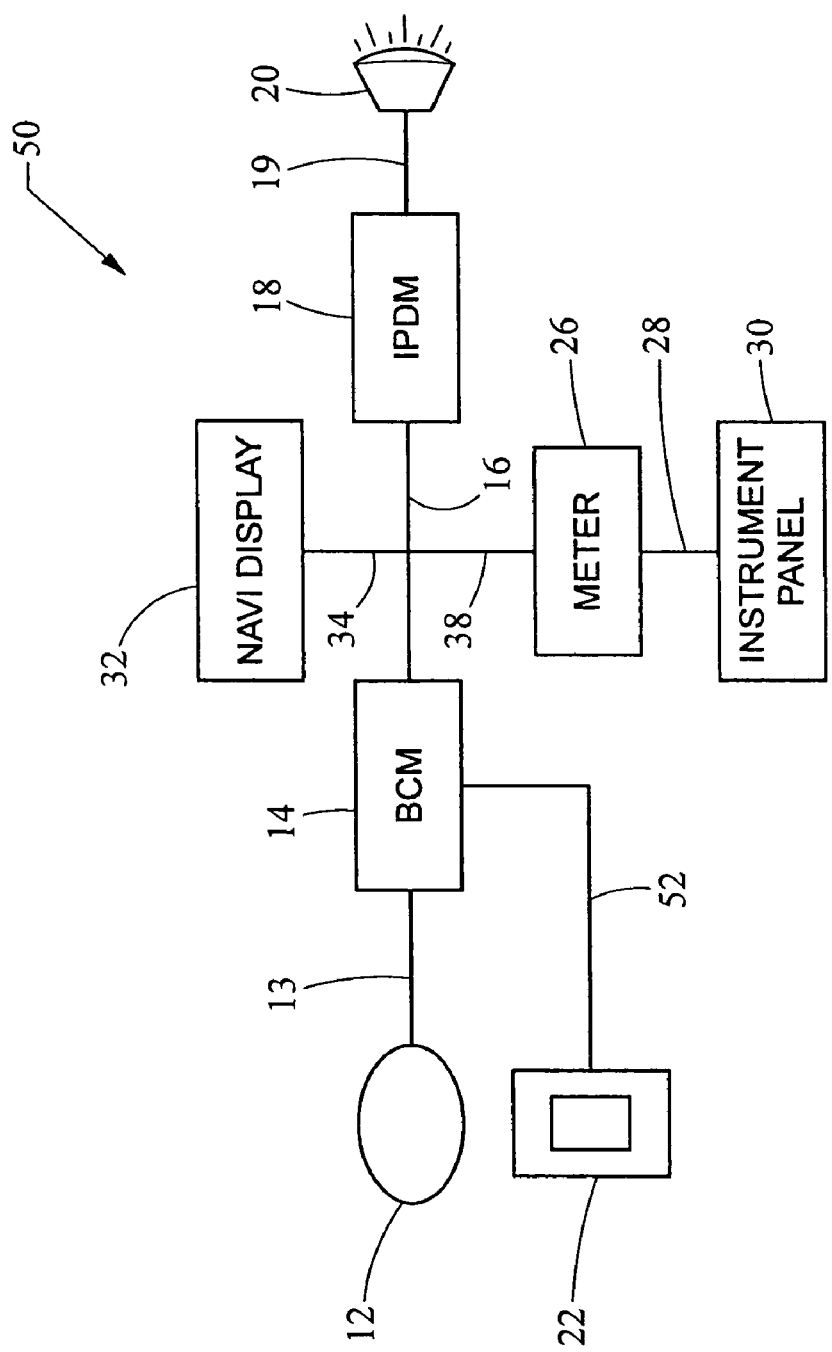
FIG. 3 is a schematic diagram of an ambient light based illumination control system in accordance with a second embodiment of this invention.

FIG. 3 illustrates ambient light based illumination control system 50 in accordance with a second embodiment of this invention. Elements and signal lines common with system 10 shown in FIG. 1 are identified by like reference numbers in FIG. 3. Control system 50 differs from control system 10 in that line 52 is provided allowing instrument panel illumination control 22 to communicate directly with body control module 14. Body control module 14 provides outputs on bus 16 to control headlamps 20 and the instrument panel lighting network 30 through meter 26. Module 14 also receives and processes control inputs from control 22 to set desired nighttime panel illumination levels. Control system 50 also differs from control system 10 in that the control functions for navigation display 32 are provided through ambient light levels detected by sensor 12. Control system 50 provides the same modulation of intensity of instrument panel lighting as provided by control system 10 as described in connection with FIG. 2.

It should be recognized that additional variations of illumination control systems can be provided in keeping with the teachings with the present invention. For example, ambient light sensor 12 could be selected to provide its high level electrical output in low lighting conditions. It is only required that ambient light sensor 12 provides an output responsive over a range of lighting conditions, as described previously.

Many vehicles are currently provided with daytime running headlamp control. In these systems, the headlamps 20 are illuminated at a low level during daylight to improve conspicuity of the vehicle. Some countries' motor vehicle laws require such daylight running headlamps. For vehicles equipped with such systems, control systems 10 and 50 would, as previously described, be operated to provide a headlight "ON" signal associated with nighttime driving which would be at a high level of headlamp intensity. However, rather than extinguishing the headlamps 20 completely in bright condition, in a daylight running application, the headlamps would be dimmed to a daytime low level of intensity. In other respects, the same instrument panel illumination control approach as described previously would be followed in such applications.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An illumination control system for a motor vehicle for controlling headlamps and instrument panel lighting of the motor vehicle, the control system comprising:
   an ambient light sensor providing an ambient light signal responsive to a range of ambient lighting conditions including a night range associated with nighttime driving conditions, a day range associated with bright driving conditions, and a transition range between the night and day ranges, and
   a control module providing a headlamp control signal for controlling lighting of the headlamps and further providing an instrument panel control signal for controlling the lighting of the instrument panel to vary the intensity of the lighting of the instrument panel from a low level when the ambient light signal is in the night range, and a high level when the ambient light signal is in the day range, and varying the lighting of the instrument panel when the ambient light signal is in the transition range over a plurality of illumination levels between the high and low levels.

2. The illumination control system in accordance with claim 1 further comprising the control module providing a display control input for controlling a vehicle display based upon the range of ambient lighting conditions.

3. The illumination control system in accordance with claim 1 further comprising the headlamp control signal causing an interruption of electrical power to the headlamps turning them to an "OFF" condition.

4. The illumination control system in accordance with claim 1 further comprising the headlamp control signal causing a reduction of electrical power to the headlamps turning them to a dimmed condition.

5. The illumination control system in accordance with claim 1 further comprising an instrument panel illumination switch which is operable by a vehicle operator to adjust the intensity of the instrument panel lighting low level.

6. The illumination control system in accordance with claim 5 further comprising the instrument panel illumination switch connected to a meter which applies modulated electrical power to vary the intensity of lighting of the instrument panel.

7. The illumination control system in accordance with claim 5 further comprising the instrument panel illumination switch connected to the control module which applies modulated electrical power to vary the intensity of lighting of the instrument panel.

8. The illumination control system in accordance with claim 7 further comprising the instrument panel control signal being directed to a meter which applies modulated electrical power to vary the intensity of lighting of the instrument panel.

9. An illumination control system for a motor vehicle for controlling headlamps and instrument panel lighting of the motor vehicle, the control system comprising:
  an ambient light sensor providing an ambient light signal responsive to a range of ambient lighting conditions including a night range associated with nighttime driving conditions, a day range associated with bright driving conditions, and a transition range between the night and day ranges with a headlamps "ON" threshold established in the transition range,
  a control module receiving the ambient light signal and providing a headlamp "ON" control signal to illuminate the headlamps when the ambient light signal is in the night range or in the transition range and indicates an ambient light level below the headlamp "ON" threshold, and providing a headlamps "OFF" control signal to reduce the intensity of lighting of the headlamps when the ambient light signal is in the day range or in the transition range and indicates an ambient light level above the headlamp "ON" threshold, and
  the control module further providing an instrument panel control signal for controlling the intensity of instrument panel lighting to vary the intensity of lighting of the instrument panel from a low level when the ambient light signal is in the night range, and a high level when the ambient light signal is in the day range, and varying the intensity of lighting of the instrument panel when the ambient light signal is in the transition range over a plurality of illumination levels between the high and low levels.

10. The illumination control system in accordance with claim 9 further comprising the control module providing a display control input for controlling a vehicle display based upon the range of ambient lighting conditions.

11. The illumination control system in accordance with claim 9 further comprising the headlamp "OFF" control signal to dim the headlamps causing an interruption of electrical power to the headlamps turning them to an "OFF" condition.

12. The illumination control system in accordance with claim 9 further comprising the headlamp "OFF" control signal to dim the headlamps causing a reduction of electrical power to the headlamps turning them to a dimmed condition.

13. The illumination control system in accordance with claim 9 further comprising an instrument panel illumination switch which is operable by a vehicle operator to adjust the intensity of the instrument panel lighting low level.

14. The illumination control system in accordance with claim 13 further comprising the instrument panel illumination switch connected to a meter which applies modulated electrical power to vary the intensity of lighting of the instrument panel.

15. The illumination control system in accordance with claim 13 further comprising the instrument panel illumination switch connected with the control module which applies modulated electrical power to vary the intensity of lighting of the instrument panel.

16. The illumination control system in accordance with claim 15 further comprising the instrument panel control signal being directed to a meter which applies modulated electrical power to vary the intensity of lighting of the instrument panel.

17. The illumination control system in accordance with claim 1, wherein the low level of the instrument panel is a preset minimum level and the high level of the instrument panel is a preset maximum level and the instrument panel control signal is configured to adjust the intensity of the lighting of the instrument panel between the preset minimum level and the preset maximum level based on the ambient light signal.

18. The illumination control system in accordance with claim 9, wherein the low level of the instrument panel is a preset minimum level and the high level of the instrument panel is a preset maximum level and the instrument panel control signal is configured to adjust the intensity of the lighting of the instrument panel between the preset minimum level and the preset maximum level based on the ambient light signal.

19. The illumination control system in accordance with claim 1 further comprising the control module providing a display control input for controlling at least one vehicle display having dynamic display characteristics based on the ambient light signal.

20. The illumination control system in accordance with claim 9 further comprising the control module providing a display control input for controlling at least one vehicle display having dynamic display characteristics based on the ambient light signal.

* * * * *